US011376688B2

(12) United States Patent
Funahira et al.

(10) Patent No.: US 11,376,688 B2
(45) Date of Patent: Jul. 5, 2022

(54) FRICTION STIR WELDING TOOL

(71) Applicants: NACHI-FUJIKOSHI CORP., Tokyo (JP); HONDA MOTOR CO., LTD., Tokyo (JP)

(72) Inventors: Nobuyuki Funahira, Toyama (JP); Takuya Miyamoto, Toyama (JP); Ryo Kawahara, Toyama (JP); Akiyoshi Miyawaki, Wako (JP); Mitsuru Sayama, Wako (JP); Keisuke Tsuta, Wako (JP); Yasumasa Hyodo, Wako (JP)

(73) Assignees: NACHI-FUJIKOSHI CORP., Tokyo (JP); HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 16/835,445

(22) Filed: Mar. 31, 2020

(65) Prior Publication Data
US 2020/0316710 A1 Oct. 8, 2020

(30) Foreign Application Priority Data

Apr. 3, 2019 (JP) .............................. JP2019-070980

(51) Int. Cl.
*B23K 20/00* (2006.01)
*B23K 20/12* (2006.01)

(52) U.S. Cl.
CPC .................. *B23K 20/1255* (2013.01)

(58) Field of Classification Search
CPC .............. B23K 20/1255; B23K 20/126; B23K 20/1265; B23K 2103/10; B23K 2103/18;
(Continued)

(56) References Cited

U.S. PATENT DOCUMENTS

2003/0042292 A1* 3/2003 Hatten ................. B23K 20/128
228/112.1
2012/0202089 A1* 8/2012 Hangai ................... C22C 21/02
428/613
(Continued)

FOREIGN PATENT DOCUMENTS

JP 2002-096158 A 4/2002
WO WO-2013/027474 A1 2/2013

OTHER PUBLICATIONS

Griggs Steel Company (www.griggsteel.com, wayback machine Oct. 18, 2017) (Year: 2017).*

*Primary Examiner* — Erin B Saad
(74) *Attorney, Agent, or Firm* — Harness, Dickey & Pierce, P.L.C.

(57) ABSTRACT

The disclosure provides a friction stir welding tool which can inhibit chipping even if an adhesion matter having high hardness adheres to a tip thereof during friction stir welding of an iron-base alloy and an aluminum alloy. In the tool for friction stir welding made of high-speed tool steel that includes a minor diameter portion and a major diameter portion formed adjacently to the minor diameter portion, hardness of the tool decreases from the minor diameter portion toward the major diameter portion. The hardness of the minor diameter portion may be 65 HRC or more by Rockwell hardness C-scale, and the hardness of the major diameter portion may be 60 HRC or less by Rockwell hardness C-scale.

2 Claims, 3 Drawing Sheets

(58) Field of Classification Search
CPC .. B23K 20/128; B23K 20/26; B23K 2103/20;
B23K 20/12; B23K 20/122
See application file for complete search history.

(56) References Cited

U.S. PATENT DOCUMENTS

2012/0325894 A1* 12/2012 Chun ................... B23K 20/126
228/112.1
2016/0332252 A1* 11/2016 Obaditch ................. B22F 7/06

* cited by examiner

FRICTION STIR WELDING TOOL

CROSS-REFERENCE TO RELATED APPLICATIONS

This application claims the benefit and priority from JP 2019-070980, filed Apr. 3, 2019. The entire disclosure of the above application is incorporated herein by reference.

BACKGROUND

Field

The present disclosure relates to a tool for friction stir welding (friction stir welding tool) used when welding metallic materials together by frictional heat generated by frictional force between the metallic materials and a rotary tool.

Description of Related Art

Mainly for welding the same metallic materials together, there is known friction stir welding (FSW), in place of means such as welding, as a technique of temporarily melting the metallic materials by inserting a rod-shaped tool rotating at high speed into a welding part of the metallic materials. In the past, there have been known various forms of the rotary tool (friction stir welding tool) used for the friction stir welding, and relatively hard materials, e.g. a high-speed tool steel and a nickel-base alloy have been in heavy usage as materials of the rotary tool (see JP 2002-96158 A and WO 2013/027474, for example).

Usually, in the case of the friction stir welding of aluminum alloys, even a friction stir welding tool made of die steel (alloy steel) typified by SKD61 may be used therefor. However, in the case of welding dissimilar metals of an aluminum alloy and an iron-base alloy together, it is necessary to consider and select a material having higher hardness for the friction stir welding tool.

BRIEF SUMMARY

Particularly, in the case that one of metals to be weld together is an iron-base alloy, an adhesion matter adhering to a tip of the friction stir welding tool during welding is higher in hardness than that in the case of welding aluminum alloys together, and the tip of the friction stir welding tool may be worn early or chipped depending on welding conditions.

Accordingly, an object of the present disclosure is to provide a tool for friction stir welding that can inhibit early wear or chipping even when an adhesion matter having high hardness adheres to the tip of the friction stir welding tool during the friction stir welding of dissimilar metallic materials such as an iron-base alloy and an aluminum alloy.

The friction stir welding tool according to the present disclosure is a friction stir welding tool made of high-speed tool steel, including a minor diameter portion and a major diameter portion, wherein hardness of the tool decreases from the minor diameter portion toward the major diameter portion. With regard to specific hardness, the hardness of the minor diameter portion is 65 HRC or more by Rockwell hardness C-scale, and the hardness of the major diameter portion is 60 HRC or less by Rockwell hardness C-scale.

The high-speed tool steel has a composition including, by weight percent, 1.20 to 1.35% of carbon, 0.5% or less of silicon, 0.5% or less of manganese, 3.5 to 4.5% of chromium, 4.5 to 5.5% of molybdenum, 5.5 to 7.0% of tungsten, 2.5 to 3.5% of vanadium, and 7.7 to 8.8% of cobalt, and 60 ppm or less of nitrogen and 20 ppm or less of oxygen, and including the remainder consisting of iron and inevitable impurities.

An equivalent circular diameter of MC-type carbide in the structure of the high-speed tool steel may be in the range of 4 to 20 μm in any section perpendicular to a forging direction or a rolling direction of the high-speed tool steel, and the ratio of the MC-type carbide in the structure may be in the range of 3 to 10%.

The friction stir welding tool made of high-speed tool steel of the present disclosure has a two-stage configuration including a minor diameter portion and a major diameter portion, and a so-called hardness gradient is applied thereto so that the hardness continuously decreases from the minor diameter portion toward the major diameter portion. As a result, even when an adhesion matter having high hardness generated during the friction stir welding of an iron-base alloy and an aluminum alloy adheres to the minor diameter portion, the adhesion matter can be easily removed from the minor diameter portion of the tool, and therefore, it is possible to prevent damage to a tip portion (minor diameter portion) while maintaining toughness of the tool.

DETAILED DESCRIPTION

Figure 1:
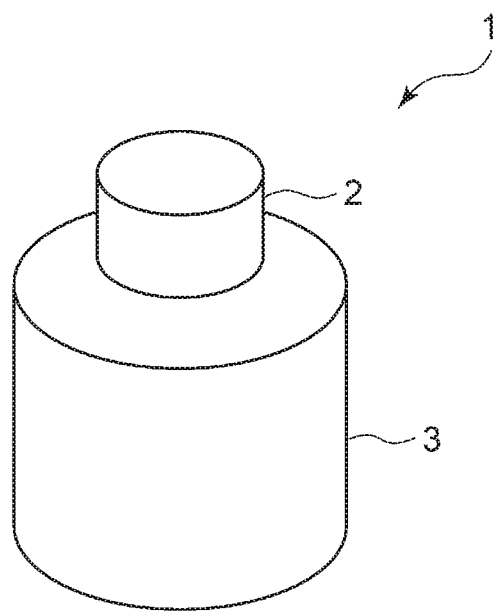
FIG. 1 is a schematic perspective view of a friction stir welding tool 1 (first embodiment) of the present disclosure.
Figure 2:
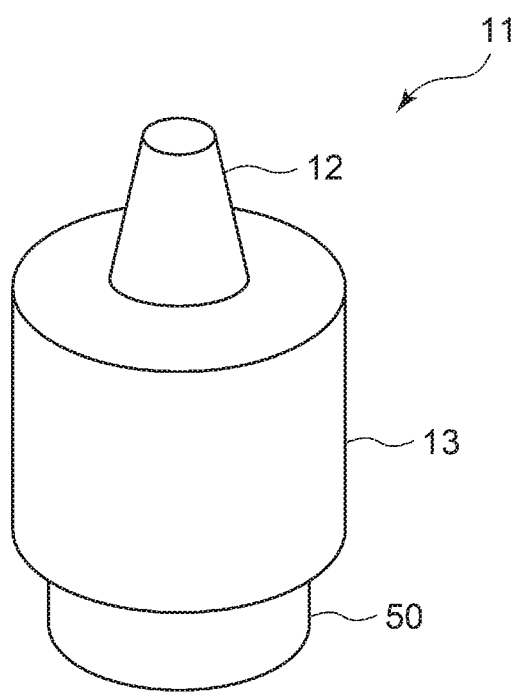
FIG. 2 is a schematic perspective view of a friction stir welding tool 11 (second embodiment) of the present disclosure.
Figure 3:
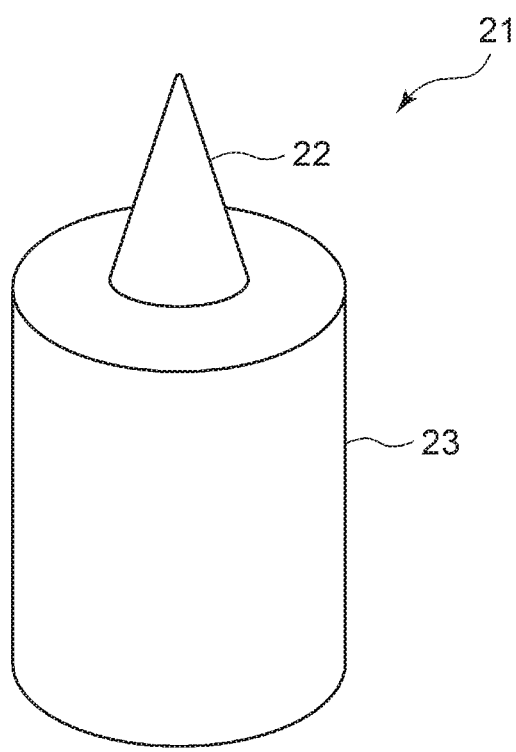
FIG. 3 is a schematic perspective view of a friction stir welding tool 21 (third embodiment) of the present disclosure.

Embodiments of the friction stir welding tool of the present disclosure will be described by using the drawings. A schematic perspective view from a tip portion (minor diameter portion) side of a friction stir welding tool 1 according to a first embodiment of the present disclosure is illustrated in FIG. 1. A schematic perspective view from a tip portion side of a friction stir welding tool 11 according to a second embodiment is illustrated in FIG. 2. A schematic perspective view from a tip portion side of a friction stir welding tool 21 according to a third embodiment is illustrated in FIG. 3.

As illustrated in FIG. 1, the friction stir welding tool 1 (hereinafter, referred to as a "tool") according to the first embodiment of the present disclosure is broadly composed of respective portions of: a minor diameter portion 2 which is generally called a probe as well; and a major diameter portion 3 formed adjacently to the minor diameter portion 2 and located in the vicinity of a rotation shaft side connected to the tool 1. The same applies to the tools 11 and 21 according to the second and third embodiments illustrated in FIGS. 2 and 3. The minor diameter portion and the major diameter portion constituting the tool are individually described below in detail.

The minor diameter portion 2 forming the tool 1 illustrated in FIG. 1 is a portion which is partly or entirely embedded into a material to be welded during the friction stir welding, and is a portion which contributes to actual friction stir welding. The entire shape of this portion can be the minor diameter portion 2 having a columnar shape as illustrated in FIG. 1, a minor diameter portion 12 having a frustum shape illustrated in FIG. 2, or a minor diameter portion 22 having a conical shape illustrated in FIG. 3.

When dissimilar metallic materials such as an iron-base alloy and an aluminum alloy that are materials to be welded are welded together, the welding is performed while holding down a surface of one of the materials, and great compression stress is generated at the tip of the minor diameter portion. Therefore, it is desirable that the tip of the minor diameter portion 2 has a form illustrated in FIG. 1 or 2 that is a smooth surface having a predetermined size (area).

The major diameter portion 3 forming the tool 1 illustrated in FIG. 1 is a portion formed adjacently to the minor diameter portion 2 and located in the vicinity of the rotation shaft side of the tool 1. In the case that the tool 1 is attached to a friction stir welding apparatus, a fastening portion 50 which is provided with a screw or a projection and a depression (fitting shape) so as to be attached to another component such as a rotation shaft of the friction stir welding apparatus may be provided on one-end side (opposite side to the minor diameter portion 12) of a major diameter portion 13 as illustrated in FIG. 2.

A so-called shoulder portion which is a boundary between the major diameter portion and the minor diameter portion may have a shape (taper shape or bowl shape) tilted toward an axially central side or an outer peripheral side, instead of a flat shape as illustrated in FIGS. 1 to 3. In the case that a fastening portion is provided on the one end side of the major diameter portion 3 or 23 as illustrated in FIG. 1 or 3, the outer peripheral surface thereof may be subjected to male threading, or a central portion thereof may be provided with a threaded hole (female thread).

Next, the material of the tool and the like will be described. The material of the tool of the present disclosure is the same material in both minor diameter portion and major diameter portion, and is high-speed tool steel limited to the following components and the like in order to provide suitability as a tool. Specifically, it is high-speed tool steel including, by weight percent, 1.20 to 1.35% of carbon (C), 0.5% or less of silicon (Si), 0.5% or less of manganese (Mn), 3.5 to 4.5% of chromium (Cr), 4.5 to 5.5% of molybdenum (Mo), 5.5 to 7.0% of tungsten (W), 2.5 to 3.5% of vanadium (V) and 7.7 to 8.8% of cobalt (Co), and 60 ppm or less of nitrogen (N) and 20 ppm or less of oxygen (O), and including the remainder consisting of Fe and inevitable impurities. It is preferable that the material is a material equivalent to SKH40 specified in JIS G4403.

An equivalent circular diameter of maximum carbide (MC-type carbide) in the structure in any section perpendicular to a forging direction or a rolling direction is in the range of 4 to 20 μm while the ratio (area ratio) of the MC-type carbide in the structure is in the range of 3 to 10%. Here, the "equivalent circular diameter" means the diameter of a circle in the case that the area of a measured particle (MC-type carbide in the present application) section is replaced with the area of the circle, and can be obtained through an image analysis software or the like using a computer.

In order to make the tool hard (e.g., 65 HRC or more by Rockwell hardness C-scale), it is effective to define each component contained in the high-speed tool steel in the above described composition range. Further, it is effective to define the MC-type carbide in the above described distribution state in terms of inhibiting chipping of the tool while reducing wear of the tool and a material to be welded.

Particularly, it is highly effective to define the content amount of nitrogen (N) which is a gas component contained in the high-speed tool steel to be 60 ppm or less, and define the content amount of oxygen (O) to be 20 ppm or less for inhibiting coarsening of carbide (MC-type carbide) formed in the structure, and ensuring toughness as a tool. By this feature as well as gradient surface hardness described below, it is possible to give a property of hardly causing chipping while keeping high wear resistance, and thus to obtain a tool suitable for friction stir welding of dissimilar metallic materials.

It should be noted that the high-speed tool steel is manufactured by smelting (casting), and that as a method of reducing gas components in the steel material in doing so, it is possible to apply one or a combination of methods such as a vacuum casting process which performs fusion, casting, or the like under a reduced-pressure atmosphere, and an ESR method which performs remelting (re-fusing) of a steel material having been once cast. Further, it is possible to finish a final form of the tool by performing press molding using a die during the smelting (casting) described above, or shaving (cutting processing) with a milling tool.

The tip (minor diameter portion) of the tool is actually used for friction stir welding and thus is subjected to a high-temperature and high-pressure atmosphere, and therefore is required to be higher in hardness than the major diameter portion. On the other hand, the major diameter portion is a portion which is directly or indirectly connected to the friction stir welding apparatus as described above. Thus, if the major diameter portion has high hardness similarly to the minor diameter portion, there is a possibility that the major diameter portion receives high pressure (bending stress) during the friction stir welding, and thus a shaft part is chipped or lost. Especially, in the case that the hardness is greatly varied between the minor diameter portion and the major diameter portion of the tool, the tendency noticeably appears at a varying point of the hardness in the axial direction of the tool.

Therefore, the major diameter portion needs to maintain enough toughness to be able to resist bending stress generated during the welding. Accordingly, the tool of the present disclosure is provided with a region where the hardness of the tool continuously decreases from the minor diameter portion toward the major diameter portion, namely, a hardness gradually varying region. One embodiment in which surface hardness is varied in the axial direction (length direction) of the tool of the present disclosure is illustrated in FIG. 4.

Figure 4:
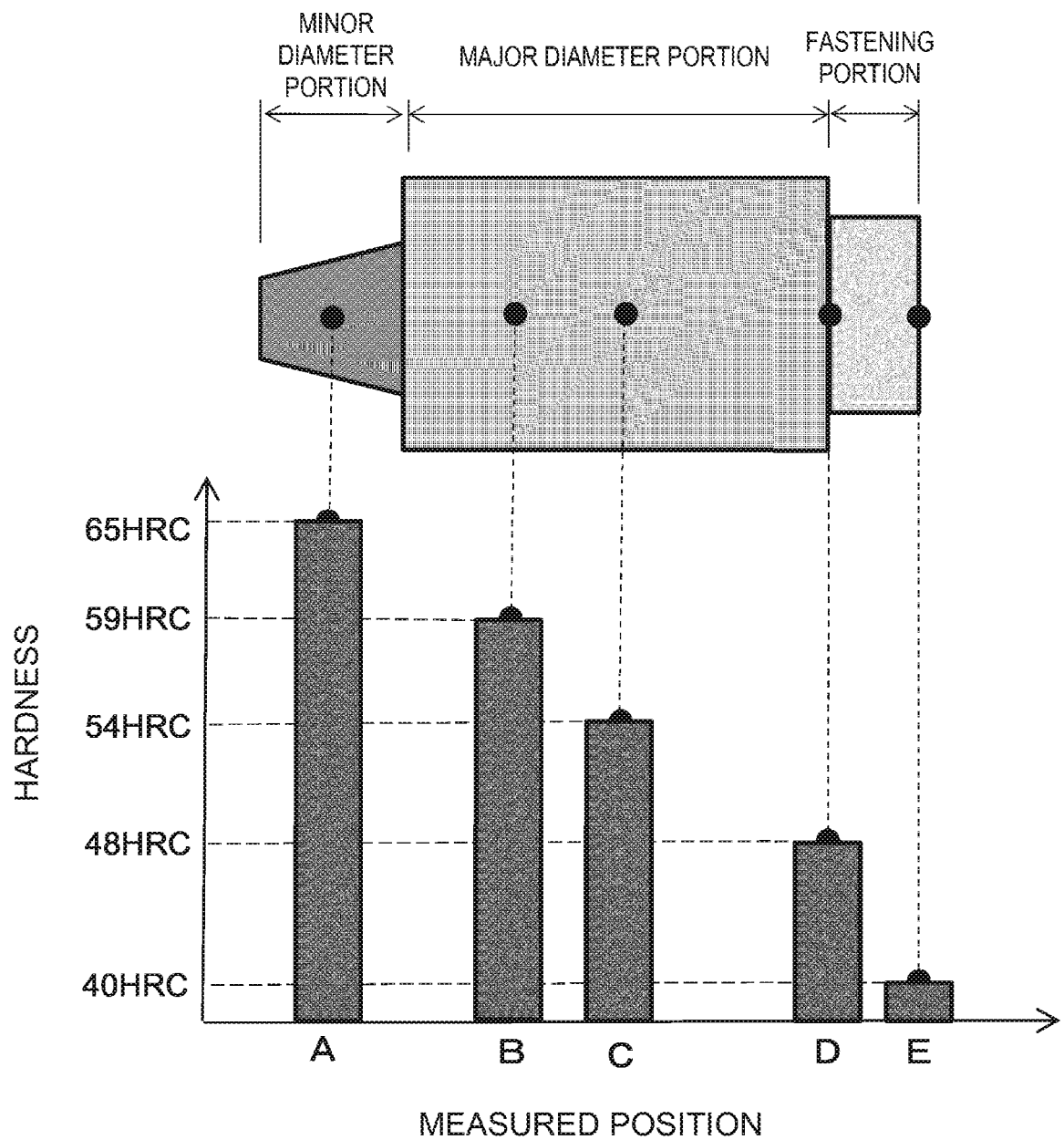
FIG. 4 is a graph relating to surface hardness of a friction stir welding tool of the present disclosure.

In the case of the tool in which the fastening portion 50 is provided on one-end side of the major diameter portion 13 illustrated in FIG. 2, the surface hardness at a central position (position A in FIG. 4) in the axial direction of the minor diameter portion is 65 HRC (equivalent to a Vickers hardness of 830 Hv) as illustrated in FIG. 4. Since the minor diameter portion of the tool is a portion buried in a material to be welded during the friction stir welding, and rotational force and welding pressure (pressing force) are simultaneously applied thereto from the friction stir welding apparatus, the minor diameter portion is a portion having the highest hardness in the tool.

Next, the surface hardness at a position (position B in FIG. 4) located at a distance of about ¼ length from the shoulder portion (boundary between the major diameter portion and the minor diameter portion) of the tool toward the major diameter portion side is 59 HRC (equivalent to a Vickers hardness of 670 Hv), and the surface hardness at a central position (position C in FIG. 4) in the length direction of the major diameter portion is 54 HRC (equivalent to a Vickers hardness of 580 Hv).

Further, the surface hardness at an end (boundary between the major diameter portion and the fastening portion: a position D in FIG. 4) of the major diameter portion is 48 HRC (equivalent to a Vickers hardness of 480 Hv). It should be noted that the surface hardness of the fastening portion (position E in FIG. 4) is 40 HRC (equivalent to a Vickers hardness of 390 Hv). Consequently, the tool of the present disclosure has the surface hardness continuously decreasing from the minor diameter portion to the major diameter portion in the axial direction, namely, a so-called hardness gradient region.

During the friction stir welding, ambient oxygen and nitrogen are also sucked there in addition to a material to be welded due to rotation of the tool, so that oxide and nitride are also generated between the tool and the material to be welded. Therefore, an adhesion matter adhering to the tip of the tool generally has hardness higher than the hardness of the material to be welded. If a material to be welded is an iron-base alloy, the hardness of the adhesion matter is still higher than that in the case of at least a light metal such as an aluminum alloy or a copper alloy.

If at least one of the materials to be welded is an iron-base alloy, the hardness of an adhesion matter generated by the friction stir welding is made at least around 62 HRC by Rockwell hardness C-scale (equivalent to a Vickers hardness of 750 Hv). Thus, the hardness of the minor diameter portion of the present disclosure is 65 HRC or more by Rockwell hardness C-scale that is higher than the hardness of the adhesion. On the contrary, if the hardness of the major diameter portion is high similarly to the hardness of the minor diameter portion, there is a possibility of causing chipping in a portion connected to the friction stir welding apparatus during the friction stir welding.

Thus, the hardness of the major diameter portion is made 60 HRC or less by Rockwell hardness C-scale in order to maintain flexibility (or ensure toughness) so as to be able to resist bending stress generated when the tool moves on a plane or a curved surface while rotating at high speed.

It should be noted that the tip (minor diameter portion) of the tool preferably has a hardness of 67 HRC or more by Rockwell hardness C-scale (equivalent to a Vickers hardness of 900 Hv) also from the viewpoint of prolonging the life of the tool, assuming that it is repeatedly used.

The invention claimed is:

1. A friction stir welding tool made of high-speed tool steel comprising a minor diameter portion and a major diameter portion formed adjacently to the minor diameter portion, wherein
hardness of the tool continuously decreases from the minor diameter portion toward the major diameter portion,
the hardness of the minor diameter portion is 65 HRC or more by Rockwell hardness C-scale, and the hardness of the major diameter portion is 60 HRC or less on Rockwell hardness C-scale, and
an equivalent circular diameter of MC-type carbide in a structure of the high-speed tool steel is in the range of 4 to 20 µm in a cross-section perpendicular to a forging direction or a rolling direction of the high-speed tool steel, and the ratio of the MC-type carbide in the structure is in the range of 3 to 10%.

2. The friction stir welding tool according to claim 1, wherein the high-speed tool steel includes, by weight percent, 1.20 to 1.35% of carbon, 0.5% or less of silicon, 0.5% or less of manganese, 3.5 to 4.5% of chromium, 4.5 to 5.5% of molybdenum, 5.5 to 7.0% of tungsten, 2.5 to 3.5% of vanadium and 7.7 to 8.8% of cobalt, and 60 ppm or less of nitrogen and 20 ppm or less of oxygen, and includes the reminder consisting of iron and inevitable impurities.

\* \* \* \* \*